US012017688B2

(12) United States Patent
Reich et al.

(10) Patent No.: US 12,017,688 B2
(45) Date of Patent: Jun. 25, 2024

(54) DEVICE FOR SPREADING GRANULATE

(71) Applicant: NOWE GmbH, Elze (DE)

(72) Inventors: Alexander Reich, Meerbusch (DE); Werner Bartling, Elze (DE); Ralf Weiß, Banteln (DE)

(73) Assignee: Nowe GmbH, Elze (DE)

( * ) Notice: Subject to any disclaimer, the term of this patent is extended or adjusted under 35 U.S.C. 154(b) by 821 days.

(21) Appl. No.: 17/262,442

(22) PCT Filed: Aug. 5, 2019

(86) PCT No.: PCT/EP2019/070955
§ 371 (c)(1),
(2) Date: Jan. 22, 2021

(87) PCT Pub. No.: WO2020/030559
PCT Pub. Date: Feb. 13, 2020

(65) Prior Publication Data
US 2021/0146966 A1 May 20, 2021

(30) Foreign Application Priority Data
Aug. 6, 2018 (AT) .............................. A 50671/2018

(51) Int. Cl.
B61C 15/10 (2006.01)
B60B 39/02 (2006.01)
(Continued)

(52) U.S. Cl.
CPC ............ B61C 15/102 (2013.01); B60B 39/02 (2013.01); B60B 39/021 (2013.01);
(Continued)

(58) Field of Classification Search
CPC ..... B61C 15/10; B61C 15/102; B61C 15/105; B61C 15/107; B61H 11/005; B60B 39/02;
(Continued)

(56) References Cited

U.S. PATENT DOCUMENTS

| 1,356,982 A | 10/1920 | Griswold |
| 2,243,243 A | 5/1941 | Campbell |

(Continued)

FOREIGN PATENT DOCUMENTS

| AT | 403559 B | 3/1998 | |
| CN | 203257620 U | * 10/2013 | ........... F01N 3/2066 |

(Continued)

OTHER PUBLICATIONS

International Search Report dated Oct. 16, 2019 for PCT/EP2019/070955 filed Feb. 13, 2020.
Written Opinion for PCT/EP2019/070955 filed Feb. 13, 2020.
Official Action dated Jun. 8, 2021 from the Russian Federation Patent Office (8 pages).
Search Report dated Jun. 2, 2021 from the Russian Federation Patent Office (5 pages).
(Continued)

Primary Examiner — S. Joseph Morano
Assistant Examiner — James William Jones
(74) Attorney, Agent, or Firm — K&L Gates LLP

(57) ABSTRACT

A device for spreading granulate, particularly for spreading sand into the gap between a rail and a wheel of a rail vehicle, includes a housing, at least one inlet for the granulate and at least one outlet for the granulate, an axially movable metering piston and a compressed air connection, which leads into a pressure chamber and serves for actuating the metering piston by compressed air to meter the granulate. At least one bore is provided in the metering piston. To create a device which is of particularly simple and compact construction, a conveying air chamber separated from the pressure chamber and has a compressed air connection is provided, and at least one bore in the metering piston connects the conveying air chamber to the at least one outlet for the granulate, such that (Continued)

granulate can be conveyed to the at least one outlet by compressed air independently of the metering process.

20 Claims, 5 Drawing Sheets

(51) Int. Cl.
    *B60B 39/04*         (2006.01)
    *B60B 39/06*         (2006.01)
    *B60B 39/08*         (2006.01)
    *B61H 11/00*         (2006.01)

(52) U.S. Cl.
    CPC ............ *B60B 39/023* (2013.01); *B60B 39/04* (2013.01); *B60B 39/06* (2013.01); *B60B 39/08* (2013.01); *B60B 39/086* (2013.01); *B61C 15/10* (2013.01); *B61C 15/105* (2013.01); *B61C 15/107* (2013.01); *B60B 39/022* (2013.01); *B60B 39/025* (2013.01); *B61H 11/005* (2013.01)

(58) Field of Classification Search
    CPC ... B60B 39/021; B60B 39/022; B60B 39/023; B60B 39/025; B60B 39/04; B60B 39/06; B60B 39/08; B60B 39/086
    USPC ......................................................... 291/11.1
    See application file for complete search history.

(56) References Cited

U.S. PATENT DOCUMENTS

| | | | |
|---|---|---|---|
| 2,360,226 A | | 10/1944 | Hauer |
| 2,606,780 A | | 8/1952 | Loftus |
| 5,826,735 A | * | 10/1998 | Litten ...................... F16F 9/34 |
| | | | 137/514.7 |
| 9,637,140 B2 | * | 5/2017 | Bartling ................ B61C 15/102 |

FOREIGN PATENT DOCUMENTS

| | | | |
|---|---|---|---|
| EP | 0656292 A1 | 6/1995 | |
| FR | 593382 A | 8/1925 | |
| SU | 1211119 A1 | 2/1986 | |
| WO | 2008-061650 A | 5/2008 | |
| WO | WO-2010031831 A1 * | 3/2010 | ............ B60B 39/10 |
| WO | 2015/055723 | 4/2015 | |
| WO | WO-2015189771 A1 * | 12/2015 | ............ B61C 15/10 |

OTHER PUBLICATIONS

Written Opinion dated Oct. 25, 2019, for PCT/EP2019/070955 (English translation) (6 pages).
International Preliminary Report on Patentability dated Feb. 9, 2021, with Written Opinion, for PCT/EP2019/070955 (English translation) (8 pages).
Preliminary Decision of Austrian Patent Office for A 50671/2018, dated Mar. 11, 2019.

* cited by examiner

DEVICE FOR SPREADING GRANULATE

FIELD OF THE INVENTION

The invention pertains to a device for spreading granulate, particularly for spreading sand into the gap between a rail and a wheel of a rail vehicle, wherein said device comprises a housing, at least one inlet for the granulate and at least one outlet for the granulate, an axially movable metering piston and a compressed air connection, which leads into a pressure chamber and serves for actuating the metering piston by means of compressed air in order to meter the granulate, and wherein at least one bore is provided in the metering piston.

BACKGROUND OF THE INVENTION

In rail vehicles, in particular, it is common practice to increase the static friction between a vehicle wheel and a rail head for a start or for a braking maneuver by spreading granulate, especially sand, into the gap between the rail and the track wheel. To this end, such spreading devices are arranged in front of the wheels of the rail vehicle and activated by means of the vehicle control, e.g. manually or also automatically. In this case, it is necessary to meter a suitable quantity of granulate from a granulate container and to convey this granulate to the gap between the rail and the wheel via a corresponding delivery line.

Most conventional devices for spreading granulate therefore comprise a corresponding metering apparatus and a separate discharging apparatus. In addition to electrically, electromagnetically or pneumatically actuated pistons, rotating cellular wheels are also suitable for metering a desired granulate quantity.

The conveyance of the metered granulate to the gap between the rail and the wheel via a delivery line is typically also realized with compressed air, e.g. as described in AT 403 559 B.

Another spreading device that is operated with compressed air is known, for example, from WO 2008/061650 A1.

FR 593 382 A describes a granulate spreading device of the type in question, wherein the granulate is metered, as well as conveyed or loosened up, at the beginning of the delivery line with one and the same compressed air flow.

EP 656 292 A1 discloses a sand spreading device, in which the sand is pneumatically metered and conveyed in a very elaborate manner.

The metering and conveying apparatuses of known granulate spreading devices frequently are relatively large such that constructions of this type are not well suited for retrofitting existing rail vehicles, in which only limited space is available. In addition, a relatively high energy input or a large quantity of compressed air is required for conveying the metered granulate over larger spatial distances.

SUMMARY OF THE INVENTION

One aspect of the invention is based on the above-described granulate spreading device that has a compact and space-saving construction and therefore is also well suited for retrofitting existing rail vehicles, in which only limited space is available. The proposed spreading device should also be characterized by a particularly high efficiency with respect to the required energy input. The disadvantages of known spreading devices should be eliminated or at least reduced.

In an embodiment, a conveying air chamber, which is separated from the pressure chamber and has a compressed air connection, is provided, and in that the at least one bore in the metering piston connects the conveying air chamber to the at least one outlet for the granulate such that granulate can be conveyed to the at least one outlet by means of compressed air independently of the metering process. According to the invention, a spatial and functional integration of the metering function and the conveying function is achieved due to the arrangement of a conveying air chamber that is separated from the pressure chamber and the arrangement of the at least one bore in the metering piston. In contrast to the prior art, no separate apparatus such as a separate injector is therefore required for conveying the metered granulate, but the compressed air flow for conveying the granulate to the outlet of the spreading device rather is conveyed through the at least one bore in the metering piston via the conveying air chamber located behind the metering piston. The discharge of the conveying air on the front end of the metering piston is spatially separated from the inlet for the granulate, but takes place in the immediate vicinity, such that the granulate and the conveying air are optimally intermixed. This contributes to a particularly efficient conveyance of the granulate to the desired location, typically the gap between a rail and a wheel, with minimal energy input. The proposed spreading device is essentially characterized by piston metering without injector. The spreading device has a particularly space-saving and compact construction and is therefore particularly well suited for retrofitting rail vehicles, in which only little space is available. The compact and relatively simple construction of the spreading device also results in a reduced maintenance effort.

According to a characteristic of the invention, multiple bores preferably are arranged in the metering piston in an annular manner. This improves the distribution of the conveying air and leads to a uniform flow rate and as a result to a greater bridgeable conveying distance or a reduced energy input and compressed air demand.

An improved conveyance of the granulate and a higher acceleration can be achieved if the bores are arranged such that they are inclined toward the center axis of the metering piston. In this context, angles of inclination in the range between 1° and 5° proved particularly suitable.

An improved continuous supply of the granulate can be ensured if a granulate chamber, which preferably is realized annularly and connected to the at least one inlet for the granulate, is arranged around the end of the metering piston that faces the at least one outlet for the granulate. The energy input for the conveyance of the granulate and the compressed air demand can be additionally reduced or the granulate can be transported to the desired location over greater distances due to the essentially annular supply of the granulate and the preferably annular discharge of the compressed air for conveying the granulate.

The at least one inlet for the granulate is ideally arranged such that it is inclined, preferably by 30° to 60°, particularly by 45°. A constant and continuous supply of the granulate can be achieved due to such an incline of the granulate inlet.

Superior metering of the granulate can be achieved if the end of the metering piston that faces the at least one outlet for the granulate is realized in a pointed manner because the point on the end of the metering piston makes it possible to continuously vary the gap size during a movement of the metering piston.

According to another characteristic of the invention, a spring is provided for resetting the metering piston. In this way, the metering piston can also be returned into the starting position without the use of compressed air. The return spring used preferably is a coil spring that has a predefined and proportionally extending spring characteristic. It would alternatively also be conceivable to use laminated disk springs with a comparable characteristic. In any case, the force of the return spring must ensure that the metering piston is returned in a fast and precise manner. In addition, the return spring prevents an unintentional discharge of the granulate during a potentially occurring pressure drop.

The spring is preferably arranged in a pressure-tight spring chamber. A pressure cushion that simplifies the return of the metering piston is formed due to the arrangement of such a pressure-tight spring chamber, in which the return spring is arranged.

A controlled return of the metering piston can be realized if a valve is arranged in this spring chamber.

The separation between the pressure chamber and the conveying air chamber may be formed by a separating element with a guide for the metering piston. The guide between the separating element and the metering piston may be realized, for example, by means of corresponding sealing lips.

A bypass for routing part of the compressed air used for conveying the granulate to the granulate inlet may be arranged between the conveying air chamber and the at least one inlet for the granulate. If part of the compressed air used is routed through such a bypass, it is possible to prevent a vacuum in the inlet for the granulate, which could lead to a compression of the granulate and as a result block the conveyance of the granulate. A slight and brief overpressure in the granulate inlet already can prevent the occurrence of an undesirable vacuum and therefore faulty metering or conveying processes.

A regulating screw preferably is provided in the bypass in order to adjust the compressed air flowing through the bypass. The regulating screw for adjusting the compressed air flowing through the bypass may in the simplest case be realized in the form of a conical screw that correspondingly varies the cross section of the bypass.

A seal, preferably an O-ring, may be arranged between the metering piston and the housing. Such a seal is preferably made of an elastic material, e.g. rubber, and makes it possible to ensure that no granulate reaches the outlet of the spreading device in the idle state.

The at least one outlet for the granulate may be connected to a delivery line. The delivery line is fastened on the outlet by means of a corresponding flange or the like and transports the metered granulate to the intended location, particularly the gap between a rail and a wheel of the rail vehicle, in order to increase the static friction between the wheel and the rail and to thereby simplify a start or a braking maneuver of the rail vehicle.

According to a design variation, the metering piston is essentially arranged horizontally and the housing can be connected to a container for the granulate from below. This variation is particularly well suited for retrofitting the spreading device in existing vehicles, particularly rail vehicles, because the structural height is particularly small. In this case, the spreading device can be simply connected to a fastened on an existing granulate container from below.

Alternatively, the metering piston may also be essentially arranged vertically and the housing may be arranged in a container for the granulate. This variation is better suited for the new construction of a rail vehicle, in which more space for accommodating the granulate container and the metering piston is potentially available.

According to a variation of the invention, the compressed air connections are connected to a common compressed air line with interposition of a throttle valve. In this case, the metering and conveying apparatus of the proposed spreading device is respectively supplied via a common compressed air line or a common compressed air connection. This so-called single-line system is particularly designed for an operating pressure of 3 bar to 8 bar or no more than 10 bar and particularly well suited for bridging shorter conveying distances, e.g. less than 1.5 m. The throttle valve or a flow resistance makes it possible to correspondingly reduce the pressure for the conveyance of the granulate relative to the pressure for the movement of the metering piston.

A so-called afterblow effect or afterblow function for clearing the delivery line after the completion of a spreading process can be respectively achieved or improved if a check valve is arranged in the compressed air line. The metering piston is moved back into its starting position after the compressed air supply has been shut off. The compressed air remaining in the pressure chamber reaches the conveying air chamber through the compressed air line via the check valve and transports potential granulate deposits in the delivery line to the end of the delivery line.

In an alternative variation, the compressed air connections are connected to two different compressed air lines. In this variation, the vehicle makes available two compressed air supplies, from which compressed air is respectively transported into the pressure chamber and the conveying air chamber via two different compressed air lines. This system is likewise designed for an operating pressure of 3 bar to 8 bar or no more than 10 bar, but is well suited for bridging greater conveying distances, e.g. up to 15 m.

The return of the metering piston into the starting position can be promoted by arranging a bleeder valve in the compressed air line.

DETAILED DESCRIPTION OF THE INVENTION

Figure 1:
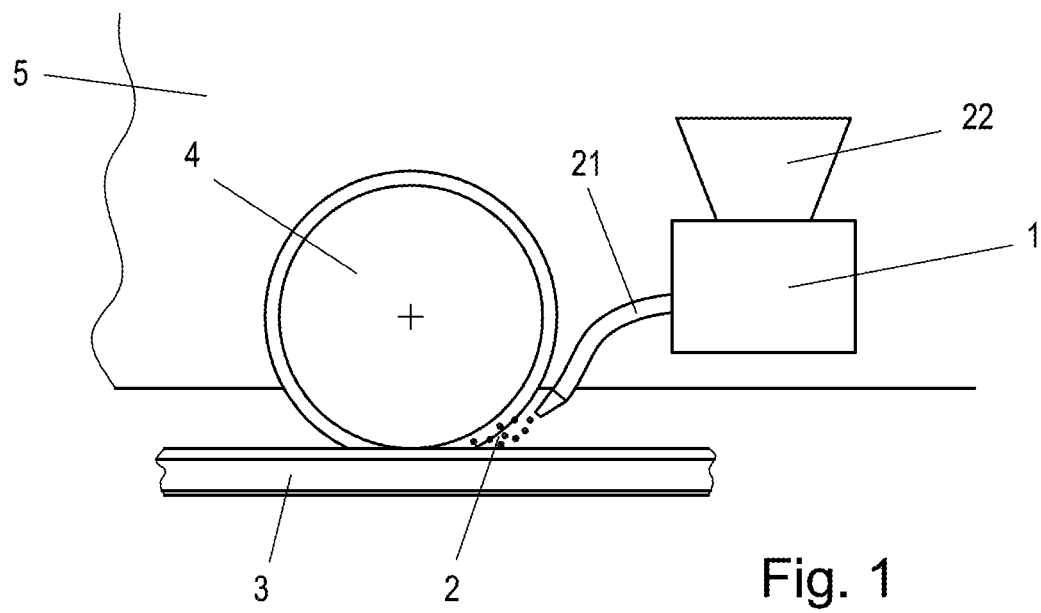
FIG. 1 shows a schematic diagram of a granulate spreading device that is mounted on a rail vehicle.

FIG. 1 shows a schematic diagram of a device 1 for spreading granulate 2, which is mounted on a rail vehicle 5. The device 1 for spreading granulate 2 is connected to a container 22 for the granulate 2 from below and meters and conveys a desired quantity of granulate 2 into the gap between a wheel 4 of the rail vehicle 5 and a rail 3 via a delivery line 21 in order to increase the friction between the rail 3 and the wheel 4. The device 1 for spreading the granulate 2 is typically controlled manually or automatically.

Figure 2:
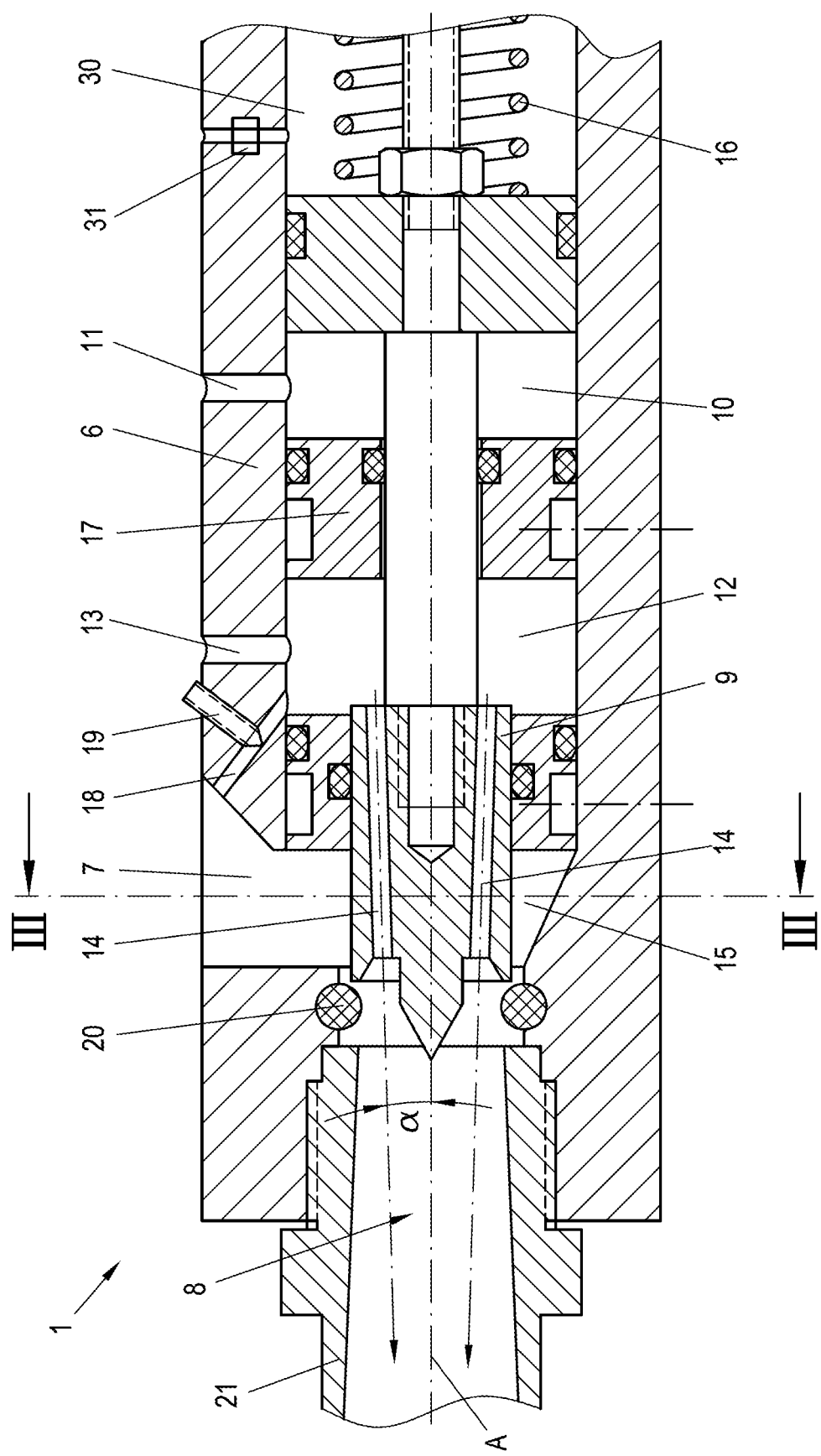
FIG. 2 shows a lateral section through a design variation of the inventive granulate spreading device in a horizontal arrangement.

FIG. 2 shows a lateral section through a design variation of the inventive device 1 for spreading granulate 2 in a horizontal arrangement underneath a container 22 for the granulate 2. The device 1 comprises a housing 6 with at least one inlet 7 for the granulate 2 and at least one outlet 8 for the granulate 2, wherein a corresponding delivery line 21 for conveying the metered granulate 2 to the desired location is connected to said granulate outlet. An axially movable metering piston 2 is located within the housing 6 in order to meter the granulate 2. The movement of the metering piston 9 is realized by means of compressed air that can be introduced into the pressure chamber 10 via a compressed air connection 11. The inlet 7 for the granulate 2 is released when the metering piston 9 is moved out of the starting position such that a quantity of granulate 2, which corresponds to the axial displacement and the duration of the displacement of the metering piston 9, can be metered in front of the metering piston 9. In the exemplary embodiment shown, the inlet 7 for the granulate 2 is connected to a preferably annular granulate chamber 15 such that a uniform and continuous supply of the granulate 2 can be achieved. A conveying air chamber 12 is arranged within the housing 6 of the device 1 separately of the pressure chamber 10, wherein compressed air can likewise be introduced into said conveying air chamber 12 via a corresponding compressed air connection 13. The compressed air of the conveying air chamber 12 reaches the end of the metering piston 9 at the outlet 8 for the granulate through at least one bore 14 in the metering piston 9 and thereby serves for conveying the metered granulate 2 to the desired location, particularly the gap between the wheel 4 and the rail 3, through the delivery line 21. Multiple bores 14 are preferably arranged in the metering piston in an annular manner in order to achieve an annular distribution of the compressed air for conveying the granulate 2. An inclination of the bores 14 relative to the center axis A of the metering piston 9, e.g. by an angle $\alpha$ between 1° and 5°, promotes a conveyance of the granulate 2 with the least energy input possible. The metering piston 9 may be realized in a pointed manner on its free end that faces the outlet 8 for the granulate 2 in order to thereby simplify the metering of the granulate 2. The inlet 7 for the granulate 2 may also have a certain inclination, preferably 30° to 60°. A continuous supply of the granulate 2 from a (not-shown) container 22 is thereby achieved. A spring 16 preferably serves for automatically returning the metering piston 9 into the starting position. The spring 16 may be realized in the form of a coil spring that is arranged in a pressure-tight spring chamber 30. The spring chamber 30 can be ventilated as needed by means of a valve 31. A corresponding seal 20, particularly an O-ring of a suitable elastic material, may be provided in order to ensure the tightness in the starting position of the metering piston 9 and to prevent an unintentional leakage of granulate 2 from the inlet 7 to the outlet 8. A separating element 17 with a corresponding guide for the metering piston 9 may be provided in order to separate the pressure chamber 10 from the conveying air chamber 12. The separating element 17, as well as the element arranged in front of the conveying air chamber 12, is fastened on the housing 6 with corresponding (not-shown) locking screws as indicated with dot-dashed lines. Corresponding guides and seals for the axially movable metering piston 9 are also arranged on the separating element 17 and on the element arranged in front of the conveying air chamber 12.

A bypass 18 may be arranged between the conveying air chamber 12 and the inlet 7 for the granulate 2 in order to prevent a vacuum in the inlet 7 for the granulate 2, wherein part of the compressed air used for conveying the granulate 2 is routed to the inlet 7 for the granulate 2 through said bypass 18. A regulating screw 19 in the bypass 18 makes it possible to adjust the quantity of the compressed air flowing through the bypass 18.

Figure 3:
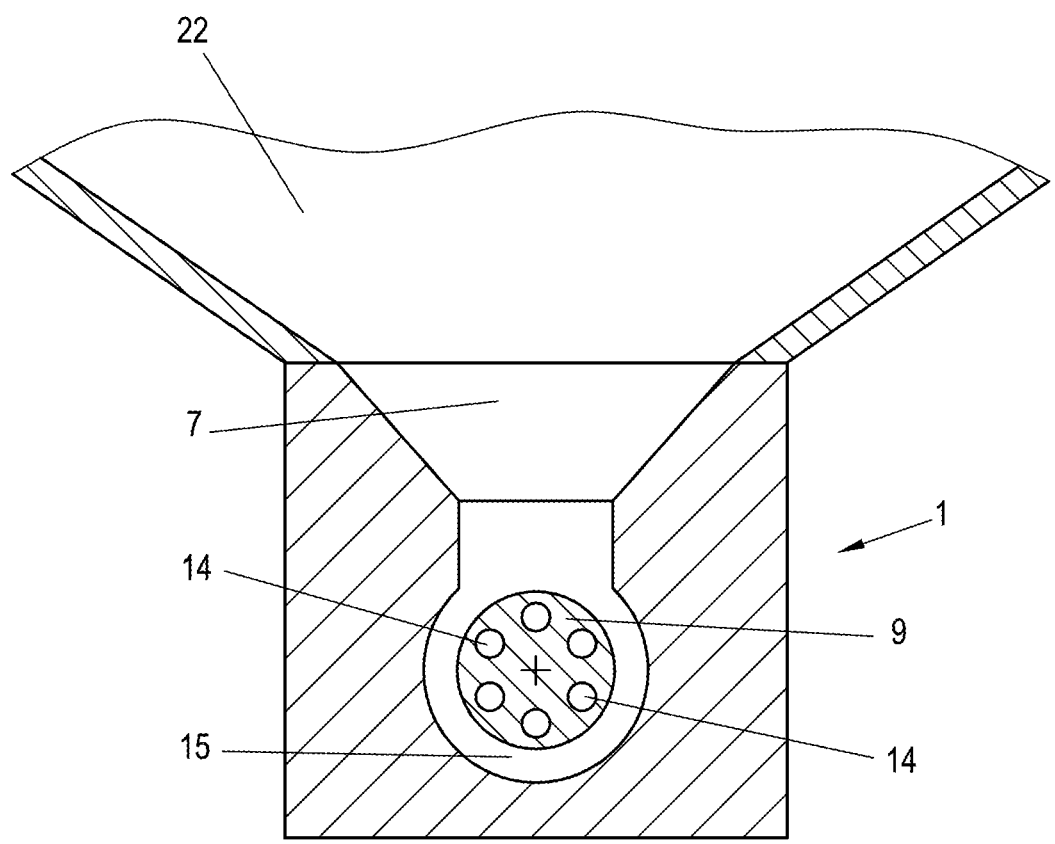
FIG. 3 shows a section through the granulate spreading device according to FIG. 2 along the line of section III-III.

FIG. 3 shows a section through the device 1 for spreading granulate 2 according to FIG. 2 along the line of section III-III. In this design variation, the device 1 for spreading granulate 2 is essentially arranged horizontally underneath a container 22 for the granulate 2. The sectional representation according to FIG. 3 shows that the metering piston 9 contains six bores 14, which are arranged in the metering piston 9 in an annular manner. The annular granulate chamber 15 is also clearly visible in this sectional representation. The horizontal arrangement of the device 1 is particularly well suited for retrofitting existing rail vehicles, in which only limited space is available.

Figure 4:
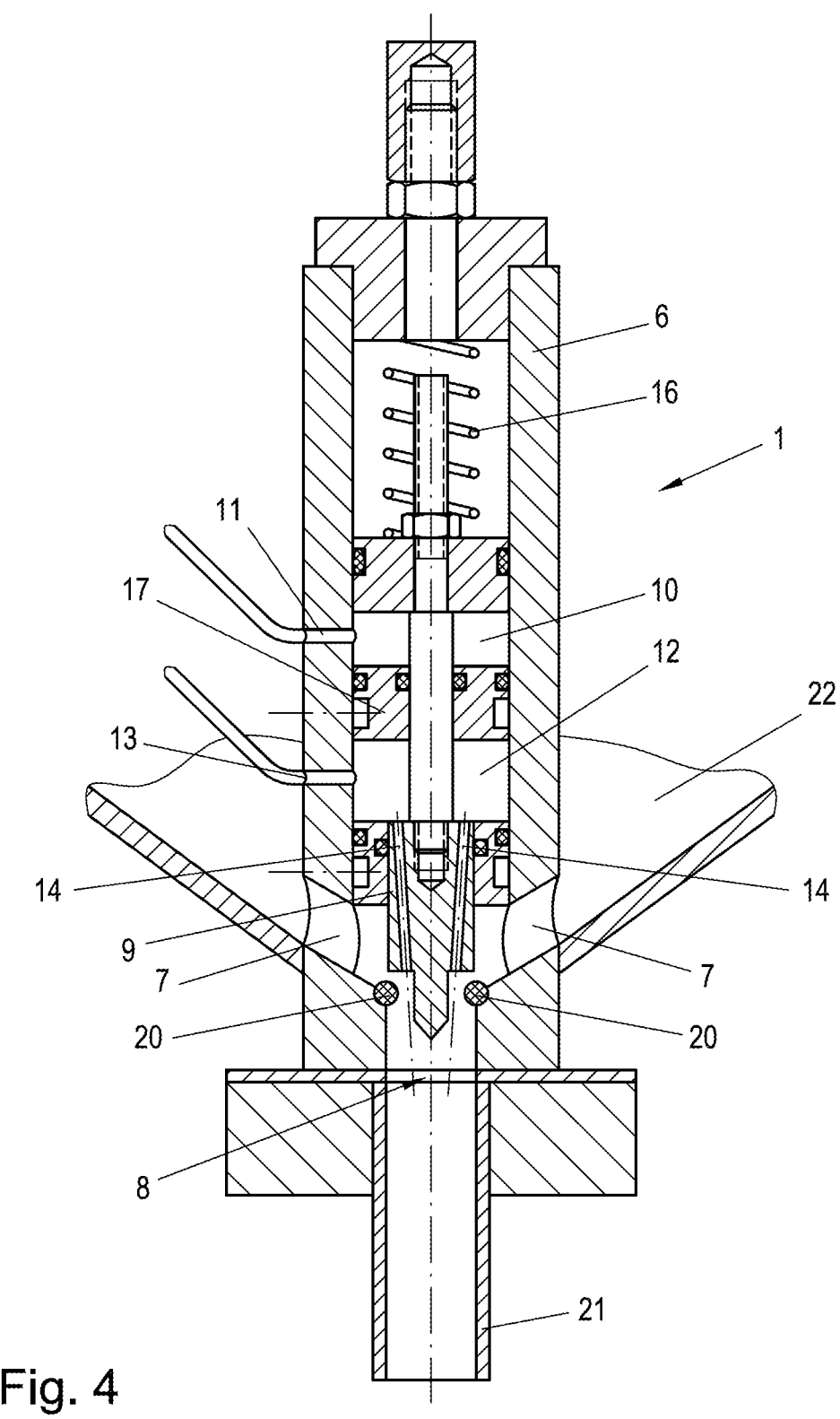
FIG. 4 shows a vertical arrangement of the granulate spreading device in a container for the granulate.

FIG. 4 shows a vertical arrangement of the device 1 for spreading granulate 2 in a container 22 for the granulate 2. In this design variation, which requires more structural space than a horizontal arrangement, the device 1 for spreading the granulate 2 is arranged in the container 22 for the granulate 2. In other respects, the function of the device 1 does not differ from that of the horizontal arrangement according to FIGS. 2 and 3.

Figure 5:
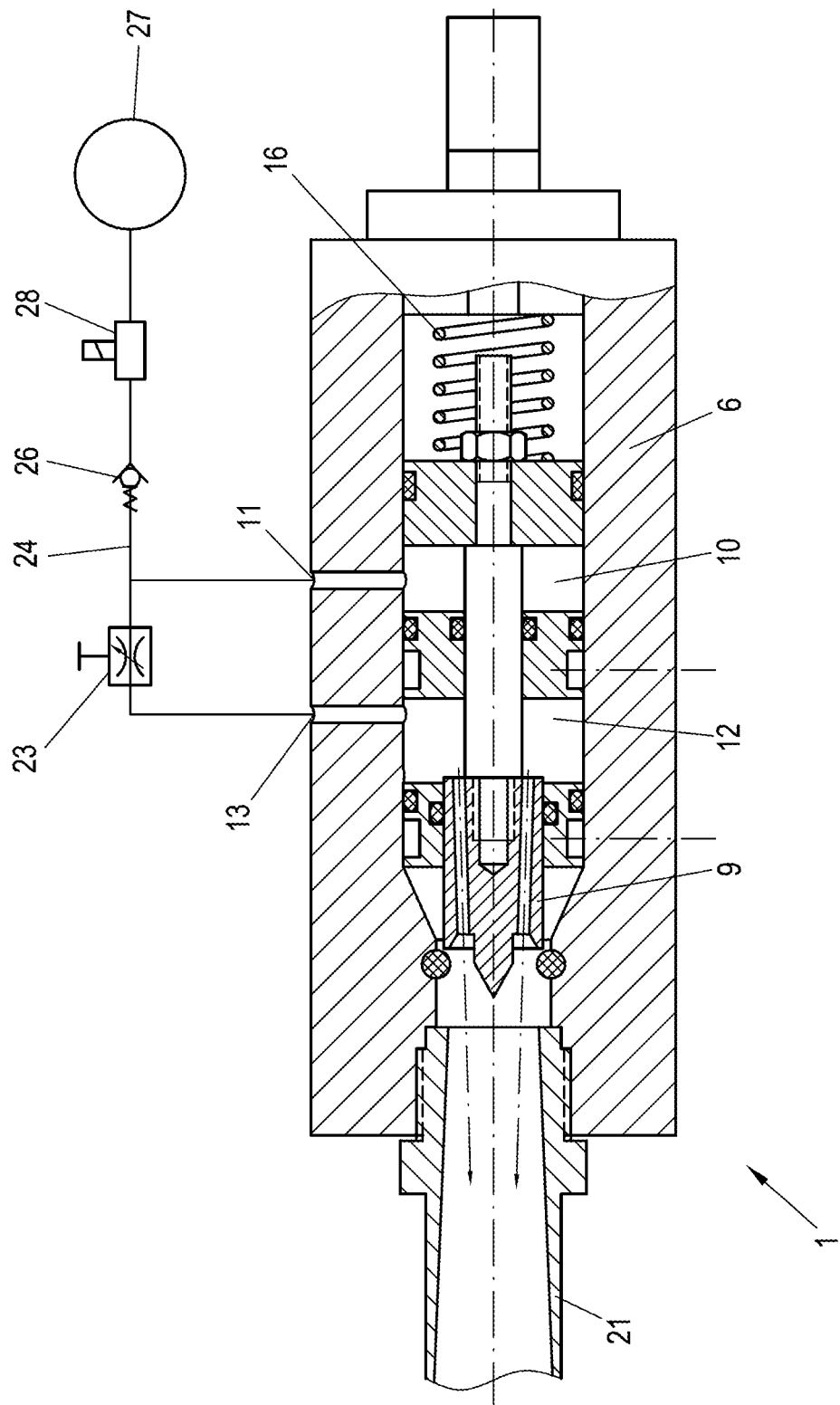
FIG. 5 shows a block diagram for visualizing a method for operating the inventive granulate spreading device.

FIG. 5 shows a block diagram for visualizing a method for operating the inventive device 1 for spreading granulate 2. In this so-called single-line system, a compressed air source 27 is connected to the pressure chamber 10 or its compressed air connection 11, as well as to the conveying air chamber 12 or its compressed air connection 13, via a common compressed air line. The desired level of the compressed air for the movement of the metering piston 9 on the one hand and for the conveyance of the granulate on the other hand can be adjusted by means of a compressed air regulator 28 and a throttle valve 23. A check valve 26 in the compressed air line 24 serves for realizing the so-called afterblow effect, according to which the compressed air in the pressure chamber 10 does not expand into the compressed air line 24 after the completion of the metering and conveying process, but rather reaches the conveying air chamber 12 and transports away granulate 2 remaining in the delivery line 21.

Figures 6, 7:
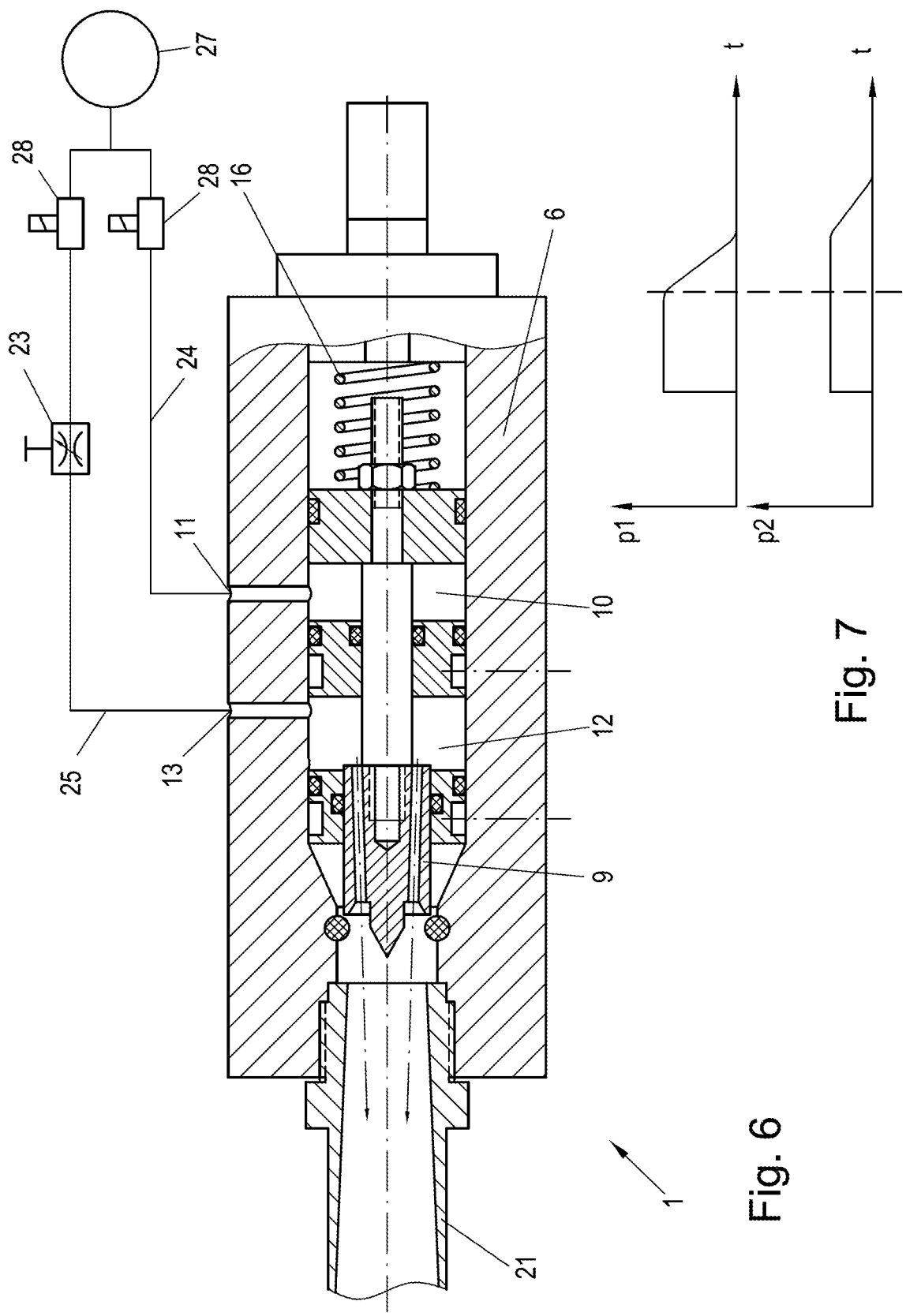
FIG. 6 shows a block diagram for visualizing an alternative method for operating the inventive granulate spreading device.
FIG. 7 shows a schematic time diagram for visualizing the control of the compressed air sources for operating the granulate spreading device.

FIG. 6 shows a block diagram for visualizing an alternative method for operating the inventive device 1 for spreading granulate 2. In the alternative method, two compressed air lines 24, 25 are respectively connected to the compressed air connection 11 for the pressure chamber 10 and the compressed air connection 13 for the conveying air chamber 12. The desired levels of the compressed air for the movement of the metering piston 9 and for the conveyance of the granulate 2 can be adjusted by means of corresponding compressed air regulators and a corresponding throttle valve 23. In this so-called two-line system, the supply of the metering chamber 10 and the supply of the conveying air chamber 12 are realized via separate compressed air lines 24, 25 and the metering function and the conveying function can be separately controlled and regulated independently of one another.

FIG. 7 ultimately shows a schematic time diagram for visualizing the control of the compressed air sources for operating the device 1 for spreading granulate 2. The compressed air p1 for moving the metering piston is activated in accordance with the desired metering of the granulate 2. The pressure p1 in the pressure chamber 10 slowly drops after the compressed air p1 for moving the metering piston 9 has been shut off. The compressed air p2 for conveying the granulate remains activated beyond the shut-off time of the metering piston 9 in order to reliably transport the granulate 2 through the delivery line 21 and to correspondingly clear the delivery line 21.

The present device 1 for spreading granulate 2 is characterized by fewer components, a space-saving construction, a lower weight and lower costs such that it can also be widely used for retrofitting existing rail vehicles. The proposed spreading device is furthermore characterized by short reaction times, little wear and a low energy requirement.

The invention claimed is:

1. A device for spreading granulate into a gap between a rail and a wheel of a rail vehicle, wherein the device comprises:
    a housing having at least one inlet for the granulate and at least one outlet for the granulate;
    an axially movable metering piston with at least one bore;
    a compressed air connection that leads into a pressure chamber and serves for actuating the metering piston by means of compressed air to meter the granulate; and
    a conveying air chamber that is separated from the pressure chamber and has a compressed air connection, and the at least one bore in the metering piston connects the conveying air chamber to the at least one outlet for the granulate, such that granulate can be conveyed to the at least one outlet by means of compressed air independently of metering the granulate, and wherein the at least one bore in the metering piston comprises multiple bores arranged in the metering piston.

2. The device according to claim 1, wherein the bores are arranged in the metering piston in an annular manner.

3. The device according to claim 2, wherein the bores are arranged such that the bores are inclined toward a center axis of the metering piston.

4. The device according to claim 1, wherein a granulate chamber is arranged around an end of the metering piston that faces the at least one outlet for the granulate.

5. The device according to claim 1, wherein the at least one inlet for the granulate is arranged such that it is inclined.

6. The device according to claim 1, wherein an end of the metering piston which faces the at least one outlet for the granulate is realized in a pointed manner.

7. The device according to claim 1, wherein a spring is provided for resetting the metering piston.

8. The device according to claim 7, wherein the spring is arranged in a pressure-tight spring chamber.

9. The device according to claim 8, wherein a valve is arranged in the spring chamber.

10. The device according to claim 1, wherein a separation between the pressure chamber and the conveying air chamber is formed by a separating element with a guide for the metering piston.

11. The device according to claim 1, wherein a bypass for routing part of the compressed air used for conveying the granulate to the inlet for the granulate is arranged between the conveying air chamber and the at least one inlet for the granulate.

12. The device according to claim 11, wherein a regulating screw is provided in the bypass.

13. The device according to claim 1, wherein a seal is arranged between the metering piston and the housing.

14. The device according to claim 1, wherein at least one outlet for the granulate is connected to a delivery line.

15. The device according to claim 1, wherein the metering piston is essentially arranged horizontally and the housing is connectable to a container for the granulate from below.

16. The device according to claim 1, wherein the metering piston is essentially arranged vertically and the housing is arranged in a container for the granulate.

17. The device according to claim 1, wherein the compressed air connections are connected to a common compressed air line with interposition of a throttle valve.

18. The device according to claim 17, wherein a check valve is arranged in the compressed air line.

19. The device according to claim 1, wherein the compressed air connections are connected to two different compressed air lines.

20. The device according to claim 19, wherein a bleeder valve is arranged in at least one of the compressed air line.

* * * * *